United States Patent
Peebler et al.

(10) Patent No.: US 10,930,049 B2
(45) Date of Patent: Feb. 23, 2021

(54) RENDERING VIRTUAL OBJECTS WITH REALISTIC SURFACE PROPERTIES THAT MATCH THE ENVIRONMENT

(71) Applicant: Apple Inc., Cupertino, CA (US)

(72) Inventors: Bradley W. Peebler, San Mateo, CA (US); Daniel Kurz, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/546,998

(22) Filed: Aug. 21, 2019

(65) Prior Publication Data

US 2020/0066025 A1 Feb. 27, 2020

Related U.S. Application Data

(60) Provisional application No. 62/723,180, filed on Aug. 27, 2018.

(51) Int. Cl.
| | | |
|---|---|---|
| *G06T 15/04* | (2011.01) | |
| *G06T 7/11* | (2017.01) | |
| *G06K 9/62* | (2006.01) | |
| *G06T 7/579* | (2017.01) | |

(52) U.S. Cl.
CPC ............ *G06T 15/04* (2013.01); *G06K 9/6256* (2013.01); *G06T 7/11* (2017.01); *G06T 7/579* (2017.01); *G06T 2207/20081* (2013.01)

(58) Field of Classification Search
CPC ...................................................... G06T 15/04
USPC ........................................................ 345/582
See application file for complete search history.

(56) References Cited

U.S. PATENT DOCUMENTS

| | | | |
|---|---|---|---|
| 8,744,121 B2* | 6/2014 | Polzin | A63F 13/56 382/103 |
| 9,578,226 B2 | 2/2017 | Gruber et al. | |
| 9,799,143 B2 | 10/2017 | Mullins et al. | |
| 10,019,962 B2* | 7/2018 | Liu | G02B 27/017 |
| 10,475,250 B1* | 11/2019 | Huang | G06T 7/70 |
| 10,613,515 B2* | 4/2020 | Cramer | B33Y 50/02 |
| 2014/0002444 A1* | 1/2014 | Bennett | G06F 3/0304 345/419 |
| 2014/0184475 A1* | 7/2014 | Tantos | G02B 27/017 345/8 |
| 2014/0320530 A1 | 10/2014 | Gruber, Jr. et al. | |
| 2016/0125656 A1* | 5/2016 | James | G02B 27/0101 345/633 |
| 2017/0031502 A1* | 2/2017 | Rosenberg | G06F 3/0414 |
| 2017/0061691 A1* | 3/2017 | Scott | G06T 7/50 |
| 2017/0061700 A1* | 3/2017 | Urbach | G06Q 20/123 |
| 2017/0347055 A1* | 11/2017 | Dore | G06T 7/60 |

(Continued)

FOREIGN PATENT DOCUMENTS

WO WO 2016107635 7/2016

*Primary Examiner* — David T Welch
(74) *Attorney, Agent, or Firm* — Thompson Hine LLP

(57) ABSTRACT

In one implementation, a method is disclosed for providing visual coherency between virtual objects and a physical environment. The method includes obtaining, at an electronic device, first content depicting a physical surface in the physical environment using an image sensor of the electronic device. An extrinsic property exhibited by the physical surface is determined based on the first content using a visual coherency model. Second content representing a virtual object is generated based on the extrinsic property to present on a display.

20 Claims, 15 Drawing Sheets

(56) References Cited

U.S. PATENT DOCUMENTS

| | | | |
|---|---|---|---|
| 2018/0033210 A1* | 2/2018 | Vats | G06F 3/017 |
| 2018/0150998 A1 | 5/2018 | Thew et al. | |
| 2018/0315248 A1* | 11/2018 | Bastov | G06T 19/006 |
| 2019/0096119 A1* | 3/2019 | Petkov | G06T 7/11 |
| 2019/0197768 A1* | 6/2019 | Taylor | A63F 13/5255 |
| 2019/0212901 A1* | 7/2019 | Garrison | G09G 5/12 |
| 2019/0228568 A1* | 7/2019 | Wu | G06T 15/205 |
| 2019/0251735 A1* | 8/2019 | Fleureau | H04N 13/232 |
| 2019/0362539 A1* | 11/2019 | Kurz | G06T 15/50 |
| 2019/0371279 A1* | 12/2019 | Mak | G09G 5/38 |
| 2020/0020166 A1* | 1/2020 | Menard | G06F 3/011 |
| 2020/0258312 A1* | 8/2020 | Shin | G06T 19/006 |

* cited by examiner

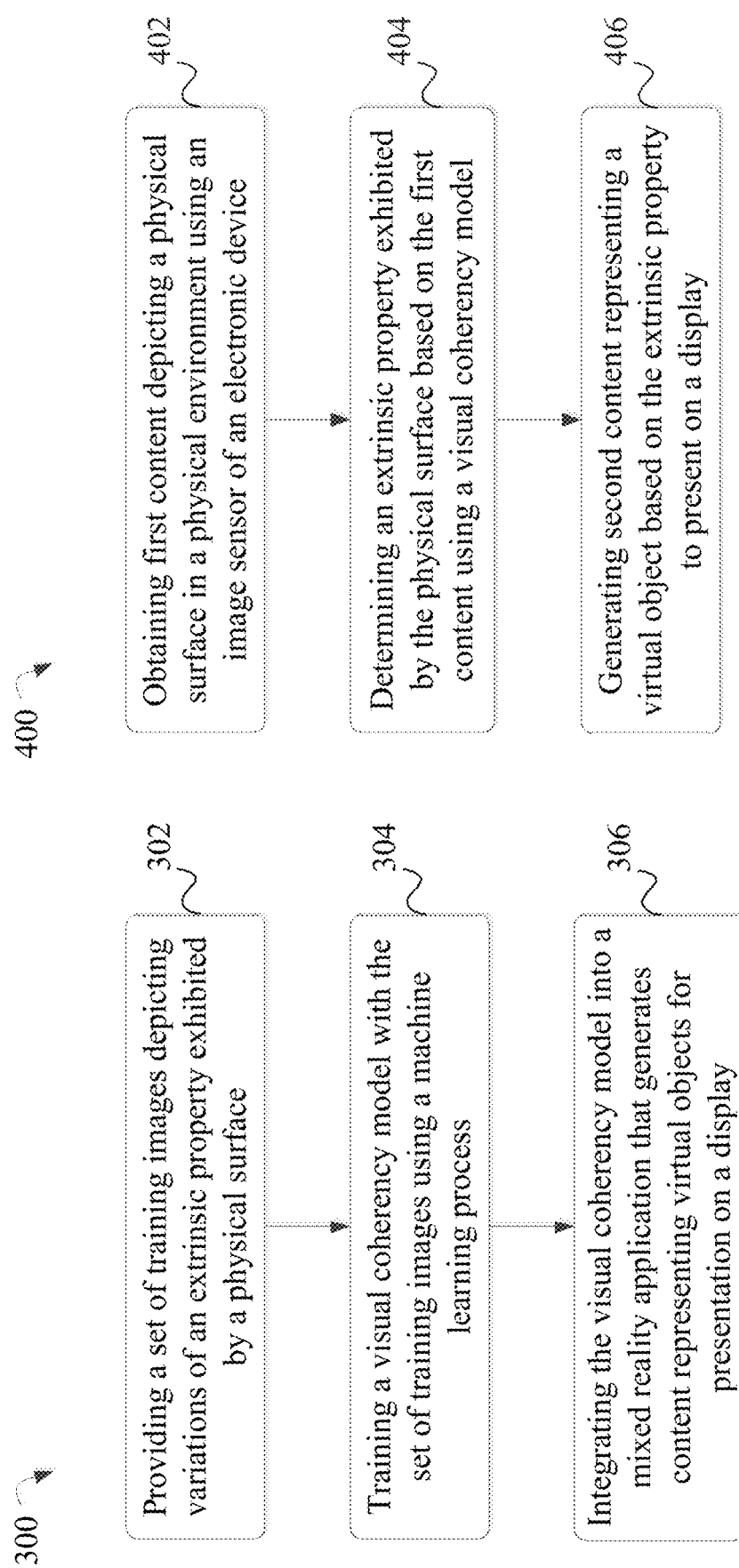

RENDERING VIRTUAL OBJECTS WITH REALISTIC SURFACE PROPERTIES THAT MATCH THE ENVIRONMENT

CROSS-REFERENCE TO RELATED APPLICATION

This application claims the benefit of U.S. Provisional Application Ser. No. 62/723,180 filed Aug. 27, 2018, which is incorporated herein in its entirety.

TECHNICAL FIELD

The present disclosure generally relates to systems, methods, and devices for generating computer generated reality (CGR) environments, and in particular, to generating CGR environments that provide visual coherency between virtual objects and a physical environment proximate to an electronic device.

BACKGROUND

Various electronic devices exist, such as head-mound devices (also known as headsets and HMDs), with displays that present users with CGR environments. These devices often generate CGR environments utilizing pre-canned (or fixed) virtual content. When presented on a display of an electronic device, that pre-canned content provides the same CGR environment without regard to visual coherency between the virtual objects and physical surfaces of the physical environment in which the electronic device is physically located.

SUMMARY

Various implementations disclosed herein include devices, systems, and methods for providing visual coherency between virtual objects and a physical environment. In one implementation, a method includes obtaining first content depicting a physical surface in a physical environment using an image sensor of an electronic device. An extrinsic property exhibited by the physical surface is determined based on the first content using a visual coherency model. Second content representing a virtual object is generated based on the extrinsic property to present on a display.

In another implementation, a system includes an electronic device with a display, a processor, and a computer-readable storage medium. The computer-readable storage medium comprises instructions that upon execution by the processor cause the system to perform operations. The operations include obtaining an extrinsic property exhibited by a physical surface proximate to an electronic device using a visual coherency model. Content representing a virtual object is generated based on the extrinsic property and presented on a display of the electronic device.

In another implementation, a non-transitory computer-readable storage medium stores program instructions that are computer-executable on a computer to perform operations. The operations include providing a set of training images depicting variations of an extrinsic property exhibited by physical surfaces. A visual coherency model is trained with the set of training images using a machine learning process. The visual coherency model is configured to determine the extrinsic property exhibited by a physical surface based on image data depicting the physical surface. The visual coherency model is integrated into a CGR application that is configured to generate content representing virtual objects for presentation on a display.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 3 is a flow-chart illustrating an example of a method for providing visual coherency between virtual objects and a physical environment.

FIG. 4 is a flow-chart illustrating another example of a method for providing visual coherency between virtual objects and a physical environment.

Figure 1:
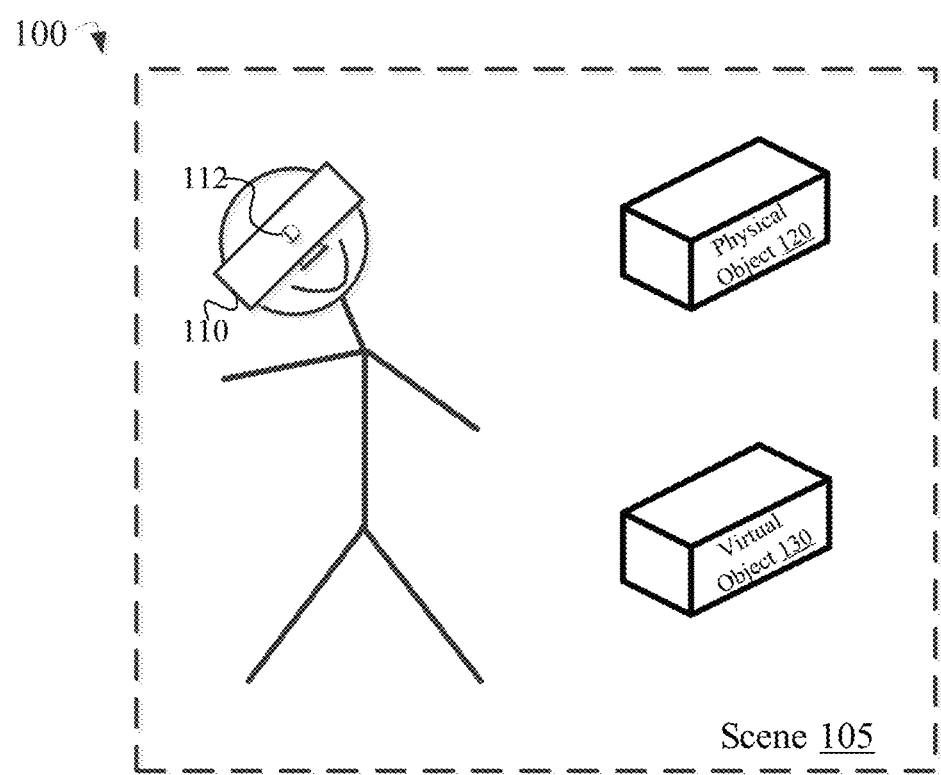
FIG. 1 is a block diagram of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein.

Referring to FIG. 1, an example operating environment 100 for some implementations is illustrated and designated generally 100. In general, operating environment 100 illustrates an electronic device 110 configured to present a user with a computer-generated reality ("CGR") environment. A CGR environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality. A virtual reality (VR) environment refers to a simulated environment that is designed to be based entirely on computer-generated sensory inputs for one or more senses. A VR environment comprises virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality. An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

As used herein, "sensory content" or "content" generally refers to attributes or characteristic of an external stimuli in a physical environment that is perceivable by one or more sensory organs of a user. Examples of "sensory content" or "content" include auditory content, visual content, tactile content, olfactory content, gustatory content, or combinations thereof.

"Sensory content" or "content" may be distinguishable on the basis of where it originates. For example, natural/physical sensory content may originate from a physical (real-world) environment proximate to electronic device 110 (e.g., scene 105). As such, physical sensory content is perceivable by a user with or without electronic device 110. In contrast, virtual sensory content refers to sensory content that is generated or at least processed by a computing device (e.g., electronic device 110). Virtual sensory content may include two-dimensional ("2D") or three-dimensional ("3D") graphical/image content, sounds, tactile feedback, and the like, which is generated or at least processed by a computing device. As such, virtual sensory content is not perceivable by a user without a computing device.

Electronic device 110 is shown as a head-mounted device ("HMD") in the example depicted by FIG. 1. Those skilled in the art will recognize that an HMD is but one form factor that is suitable for implementing electronic device 110. Other form factors that are suitable for implementing electronic device 110 include smartphones, AR glasses, smart glasses, desktop computers, laptops, tablets, computing devices, and the like. In some implementations, electronic device 110 includes a suitable combination of software, firmware, or hardware.

Figure 2:
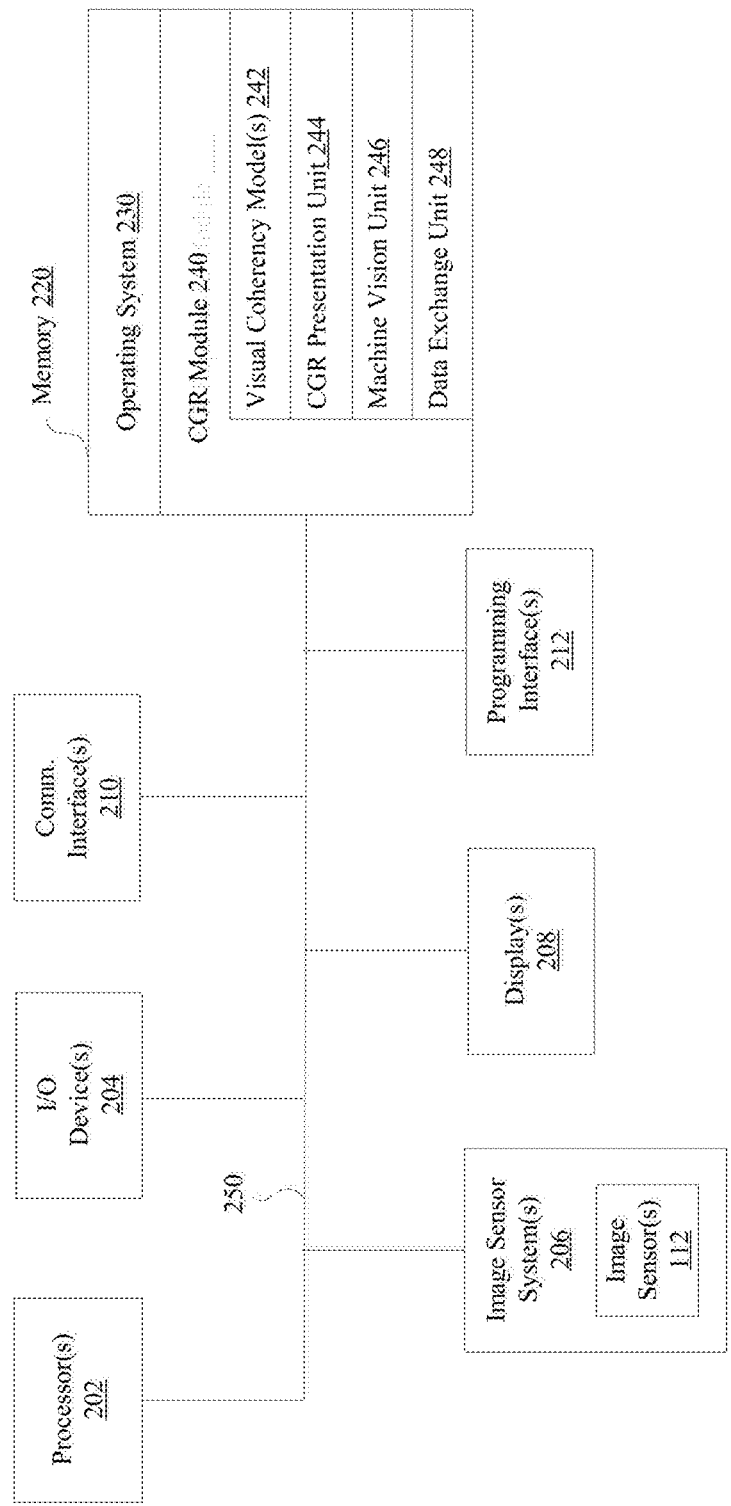
FIG. 2 is a block diagram of an example electronic device that is suitable for some implementations.

For example, electronic device 110 may include image sensor 112 and an output device (e.g., display 208 of FIG. 2). Examples of suitable devices for implementing the output device include a display, an audio speaker, a haptic device, and the like. In one implementation, electronic device 110 includes an output device disposed on an inward facing surface of electronic device 110.

Image sensor 112 is configured to obtain image data corresponding to a scene or physical environment (e.g., scene 105) in which electronic device 110 is located. In one implementation, image sensor 112 is part of an array of image sensors configured to capture light field images corresponding to a physical environment (e.g., scene 105) in which electronic device 110 is located. In one implementation, image sensor 112 is a component of a depth camera.

Some implementations describe virtual sensory content and physical sensory content in terms of visual sensory content. However, implementations are not limited to visual sensory content, but rather may include any type of sensory content described above with respect to FIG. 1 when an electronic device includes appropriate sensors and output devices. For example, aspects disclosed herein are equally applicable to auditory content when an electronic device includes appropriate sensors and output devices, such as a microphone and speaker, respectively.

FIG. 2 is a block diagram of an example electronic device 110 that is suitable for some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations electronic device 110 includes one or more processors 202 (e.g., microprocessors, ASICs, FPGAs, GPUs, CPUs, processing cores, or the like), one or more I/O devices 204, one or more interior or exterior facing image sensor systems 206, one or more displays 208, one or more communication interfaces 210 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, or the like type interface), one or more programming (e.g., I/O) interfaces 212, a memory 220, and one or more communication buses 250 for interconnecting these and various other components. In brief, a GPU can include a specialized electronic circuit designed to rapidly manipulate and alter memory to accelerate the creation of images in a frame buffer. A GPU can be present on a video card, or it can be embedded on a motherboard or—in certain CPUs—on the CPU die.

The one or more I/O devices 204 are configured to provide a human to machine interface exchanging commands, requests, information, data, and the like, between electronic device 110 and a user. The one or more I/O devices 204 can include, but are not limited to, a keyboard, a pointing device, a microphone, a joystick, and the like.

The one or more image sensor systems 206 comprise an image sensor (e.g., image sensor 112) configured to obtain content depicting a physical environment in which electronic device 110 is located ("physical content"). In one implementation, the one or more image sensor systems 206 include an array of image sensors configured to capture light field images corresponding to a physical environment in which electronic device 110 is located. In one implementation, image sensor 212 is disposed on an exterior surface of electronic device 110. Examples of suitable image sensors for effectuating image sensors of the one or more image sensor systems 206 may include one or more RGB camera (e.g., with a complimentary metal-oxide-semiconductor ("CMOS") image sensor or a charge-coupled device ("CCD") image sensor), monochrome camera, IR camera, event-based camera, or the like.

In some implementations, the one or more image sensor systems 206 are configured to obtain image data that corresponds to at least a portion of the face of the user that includes the eyes of the user. In various implementations, the one or more image sensor systems 206 further include illumination sources that emit light upon the portion of the face of the user, such as a flash or a glint source.

In some implementations, the one or more displays 208 are configured to present content, as described below in greater detail, to the user. In some implementations, the one or more displays 208 correspond to holographic, digital light processing ("DLP"), liquid-crystal display ("LCD"), liquid-crystal on silicon ("LCoS"), organic light-emitting field-effect transitory ("OLET"), organic light-emitting diode ("OLED"), surface-conduction electron-emitter display ("SED"), field-emission display ("FED"), quantum-dot light-emitting diode ("QD-LED"), micro-electro-mechanical system ("MEMS"), or the like display types. In some implementations, the one or more 208 correspond to diffractive, reflective, polarized, holographic, etc. waveguide displays. In some implementations, the one or more displays 208 are capable of presenting any combination of physical content and virtual content.

In one implementation, the one or more displays 208 includes a display device comprising a plurality of pixels and is configured to present content comprising image data obtained using image sensor 112. Each pixel among the plurality of pixels may be implemented using light-emitting diodes (LEDs), organic light-emitting diodes (OLEDs), plasma cells, liquid crystal display (LCD) components, and the like. In one implementation, the one or more displays 208 are disposed on an inward facing surface of electronic device 110. In one implementation, the one or more displays 208 are a see-through display through which a portion of the physical environment is visible.

In one implementation, the one or more displays 208 include a stereoscopic image display for presenting left-eye and right-eye view points. In one implementation, the stereoscopic image display presents a stereoscopic subset of a 3D representation of a scene corresponding to a physical environment (e.g., scene 105 of FIG. 1) in which electronic device 110 is located. In one implementation, the 3D representation of the scene is reconstructed using light field images captured by an array of image sensors included in image sensor system 206.

The one or more communication interfaces 210 can include any device or group of devices suitable for establishing a wired or wireless data or telephone connection to one or more networks. Non-limiting examples of a network interface device include an Ethernet network adapter, a modem, or the like. A device can transmit messages as electronic or optical signals.

The one or more programming (e.g., I/O) interfaces 212 are configured to communicatively couple the one or more I/O devices with other components of electronic device 110. As such, the one or more programming interfaces 212 are capable of accepting commands or input from a user via the one or more I/O devices 204 and transmitting the entered input to the one or more processors 202.

The memory 220 can include any suitable computer-readable medium. A computer readable storage medium should not be construed as transitory signals per se (e.g., radio waves or other propagating electromagnetic waves, electromagnetic waves propagating through a transmission media such as a waveguide, or electrical signals transmitted through a wire). For example the memory 220 may include high-speed random-access memory, such as DRAM, SRAM, DDR RAM, or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. Instructions stored in the memory 220 may be executed by the one or more processors 202 to perform a variety of methods and operations, including the technique for enriching locally-sourced image data described in greater detail below.

In some implementations, the memory 220 or the non-transitory computer readable storage medium of the memory 220 stores the following programs, modules and data structures, or a subset thereof including an optional operating system 230 and a CGR module 240. The operating system 230 includes procedures for handling various basic system services and for performing hardware dependent tasks. In some implementations, the CGR module 240 is configured to generate CGR environments based on extrinsic properties exhibited by physical surfaces for presentation to a user via the one or more displays 208. To that end, in various implementations, the CGR module 240 includes a visual coherency model(s) 242, a CGR presentation unit 244, a machine vision unit 246, and a data exchange unit 248.

In some implementations, the visual coherency model(s) 242 is configured to determine an extrinsic property (or a value for the extrinsic property) exhibited by a physical surface based on content depicting the physical surface that is obtained using image sensor system 206. To that end, in various implementations, the visual coherency model(s) 242 includes instructions or logic therefor, and heuristics and metadata therefor.

In some implementations, the CGR presentation unit 244 is configured to generate content representing a virtual object for presentation on the one or more displays 208 using an extrinsic property (or value for the extrinsic property) exhibited by a physical surface that visual coherency model(s) 242 determines based on content depicting the physical surface that is obtained using image sensor system 206. To that end, in various implementations, the CGR presentation unit 244 includes instructions or logic therefor, and heuristics and metadata therefor.

In some implementations, the machine vision unit 246 is configured to perform various image processing techniques (e.g., classification, feature extraction, multi-scale signal analysis, pattern recognition, projection, physical geometry estimation, and the like) on image data received from an image sensor of image sensor system 206. To that end, in various implementations, the machine vision unit 246 includes instructions or logic therefor, and heuristics and metadata therefor.

In some implementations, the data exchanging unit 248 is configured to obtain data (e.g., presentation data, interaction data, sensor data, location data, etc.) from one or more computing devices external to electronic device 110. In some implementations, the data exchanging unit 248 is configured to transmit data (e.g., presentation data, location data, etc.) to one or more computing devices external to electronic device 110. To those ends, in various implementations, the data transmitting unit 248 includes instructions or logic therefor, and heuristics and metadata therefor.

Although the visual coherency model(s) 242, the CGR presentation unit 244, the machine vision unit 246, and the data exchange unit 248 are shown as residing on a single device (e.g., electronic device 110), it should be understood that in other implementations, any combination of the visual coherency model(s) 242, the CGR presentation unit 244, the machine vision unit 246, and the data exchange unit 248 may be located in separate computing devices.

FIG. 2 is intended more as functional description of the various features which are present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, or firmware chosen for a particular implementation.

An important consideration when rendering virtual objects is that the virtual objects should appear realistic and smoothly blend into a surrounding physical environment when presented to a user on a display. One existing technique of generating CGR environments involves estimating an illumination level of a surrounding physical environment, at large. The existing technique then applies that estimated illumination level when rendering virtual objects to be superimposed on a display over the surrounding physical environment.

For example, one CGR experience generated by the electronic device using that existing technique may estimate an illumination level associated with a dark room. The electronic device may then apply the estimated illumination level when rendering a virtual vase to be superimposed on a display over a table in the dark room. A virtual vase that was rendered based on the estimated illumination level of dark room may appear more realistic than a virtual vase that was rendered without considering the illumination level of the dark room. However, even if the general illumination level of a physical environment could be determined with a sufficient accuracy and applied to render a virtual object, there are still instances in which the virtual object and the physical environment are not visually coherent.

By way of example, dust may have accumulated on the table in the dark room discussed above. In that instance, a user of the electronic device would expect the virtual vase superimposed on the display over that table to also appear dusty. Yet, when the virtual vase was rendered only the general illumination level of the dark room was considered. Accordingly, while the virtual vase may mimic the darkness of the surrounding room as a whole, a surface of the virtual vase would lack the dusty appearance of the underlying table. As a result, the virtual vase that is devoid of any accumulated dust would appear visually distinct from the underlying table upon which dust has accumulated. Thus, a visual coherency between virtual objects and a surrounding physical environment is limited under that existing technique by failing to consider extrinsic properties (e.g., dust) exhibited by physical surfaces in the surrounding physical environment when rendering virtual objects.

As used herein, a "surface property" refers to a visually perceivable, superficial characteristic exhibited by a physical surface in a physical environment. Surface properties are distinguishable on the basis of where they originate. An "intrinsic property" is a surface property that originates from a material composition of a physical surface. Stated differently, an intrinsic property exhibited by a physical surface is independent on an interaction with a physical environment in which the physical surface is located. Some intrinsic properties that a physical surface may exhibit include: color properties (e.g., distribution, intensity, contrast, patterning, etc.), opacity, reflectivity, glossiness, translucency, and the like. An "extrinsic property" is a surface property that originates from a physical environment proximate to a physical surface. Stated differently, an extrinsic property exhibited by a physical surface is dependent on an interaction with a physical environment in which the physical surface is located. Some extrinsic properties that a physical surface may exhibit include: dusty, wet, icy, snow covered, rusty, dirty, worn, rain covered, scratched, pollen covered, sun-bleached, stained, burnt, smoke damaged, and the like.

In contrast to the existing technique discussed above, some implementations disclosed herein generate CGR experiences that provide visual coherency between virtual objects and a physical environment based on extrinsic properties exhibited by physical surfaces in the physical environment. As such, a CGR experience generated by an electronic device would modify the virtual object in the previous example to appear dusty like the underlying table surface. Specifically, as described in greater detail below, the electronic device would obtain the extrinsic property (i.e., dusty) exhibited by the underlying table surface using a visual coherency model and generate content representing the virtual vase based on the extrinsic property. As also described in greater detail below, the visual coherency model determines the extrinsic property based on content depicting the underlying table surface. In some implementations, the visual coherency model determines a value for the extrinsic property. For example, the value may be a probability estimate that the underlying table surface exhibits the extrinsic property.

FIG. 3 is a flow-chart illustrating an example of a method 300 for providing visual coherency between virtual objects and a physical environment. At block 302, method 300 includes providing a set of training images depicting variations of an extrinsic property exhibited by physical surfaces. In one implementation, the set of training images is a set of labeled training images that include context labels for each labeled training image that identifies a particular value for a corresponding variation of the extrinsic property depicted in that labeled training image. In one implementation, the set of training images is a set of unlabeled training images.

At block 304, method 300 includes training a visual coherency model (e.g., visual coherency model 242 of FIG. 2) with the set of training images using a machine learning process. In one implementation, the visual coherency model is configured to determine the extrinsic property exhibited by a physical surface based on content depicting the physical surface. In one implementation, the visual coherency model is configured to determine values for the extrinsic property exhibited by a physical surface based on image data depicting the physical surface.

In one implementation, the machine learning process employs a supervised learning technique. As understood by one skilled in the art, supervised learning techniques are machine learning processes in which a computing device identifies rules (or functions) that map example inputs (e.g., a set of labeled training images) with desired outputs (e.g., context labels for each labeled training image). Examples of suitable supervised learning techniques for this implementation include: linear regression, logistic regression, neural networks, support vector machines, naïve bayes, random forest, classification trees, and the like.

In one implementation, the machine learning process employs an unsupervised learning technique. As understood by one skilled in the art, unsupervised learning techniques are machine learning processes in which a computing device identifies a structure (e.g., recognizes a pattern) in example inputs (e.g., a set of unlabeled training images). Examples of suitable unsupervised learning techniques for this implementation include: clustering techniques (e.g., K-means, hierarchical clustering, mixture models, etc.), dimensionality reduction techniques (e.g., principal component analysis, independent component analysis, autoencoder, etc.), and the like. In one implementation, training the visual coherency model includes clustering a set of unlabeled training images into a plurality of clusters. In this implementation, each cluster of the plurality of clusters corresponds to a particular variation of the extrinsic property.

In one implementation in which the set of training images is a set of unlabeled training images, method 300 further comprises providing manually-defined context labels for assignment to each of the plurality of clusters. In one implementation in which the set of training images is a set of unlabeled training images, method 300 further comprises providing a set of labeled training images that include context labels for each labeled training image, each context label identifying a corresponding variation of the extrinsic property depicted in that labeled training image. In one implementation in which the set of training images is a set of unlabeled training images, method 300 further comprises providing a set of labeled training images that include context labels for each labeled training image that identifies a specified value for a corresponding variation of the extrinsic property depicted in that labeled training image.

In one implementation, the manually-defined context labels or the set of labeled training images are provided to the same machine learning process that clustered the set of unlabeled training images into the plurality of clusters. For example, the manually-defined context labels may be provided to that machine learning process via a feedback mechanism. In one implementation, the machine learning process that clustered the set of unlabeled training images into the plurality of clusters is a first machine learning process. In this implementation, the manually-defined context labels or the set of labeled training images are provided to a second machine learning process that is distinct from the first machine learning process.

At block 306, method 300 includes integrating the visual coherency model into a CGR application that generates content representing virtual objects for presentation on a display. In one implementation, the CGR application is implemented as CGR module 240 of FIG. 2. In one implementation, the visual coherency model is configured to determine a plurality of extrinsic properties exhibited by the physical surface. In one implementation, the visual coherency model is configured to determine values for a plurality of extrinsic properties exhibited by the physical surface.

In one implementation, the visual coherency model is a first visual coherency model and the extrinsic property is a first extrinsic property. In this implementation, method 300 further includes training a second visual coherency model with a second set of training images using the machine learning process. The second set of training images depict variations of a second extrinsic property. In one implementation, the second visual coherency model is configured to determine the second extrinsic property exhibited by the physical surface based on image data depicting the physical surface. In one implementation, the second visual coherency model is configured to determine values for the second extrinsic property exhibited by the physical surface based on image data depicting the physical surface. In one implementation, method 300 further includes integrating the second visual coherency model into the CGR application that generates content representing virtual objects for presentation on a display.

FIG. 4 is a flow-chart illustrating another example of a method 400 for providing visual coherency between virtual objects and a physical environment. At block 402, method 400 includes obtaining first content depicting a physical surface in a physical environment using an image sensor of the electronic device. In one implementation, the first content is a video of the physical environment comprising a sequence of images of the physical environment. At block 404, method 400 includes determining an extrinsic property exhibited by the physical surface based on the first content using a visual coherency model. In one implementation, the visual coherency model is implemented using visual coherency model 242 of FIG. 2. In one implementation, a value for the extrinsic property is determined based on the first content using the visual coherency model. In one implementation, the value is a probability estimate that the physical surface exhibits the extrinsic property. In one implementation, the value is indicative of a degree to which the physical surface exhibits the extrinsic property.

At block 406, method 400 includes generating second content representing a virtual object based on the extrinsic property to present on a display. In one implementation, generating the second content representing the virtual object is based on a value for the extrinsic property. In one implementation, generating the second content involves changing an appearance of the virtual object by an amount that is based on a probability estimate. In one implementation, the display is a see-through display with a portion of the physical environment being visible through the see-through display. In one implementation, the display is a display device comprising a plurality of pixels.

Figure 5:
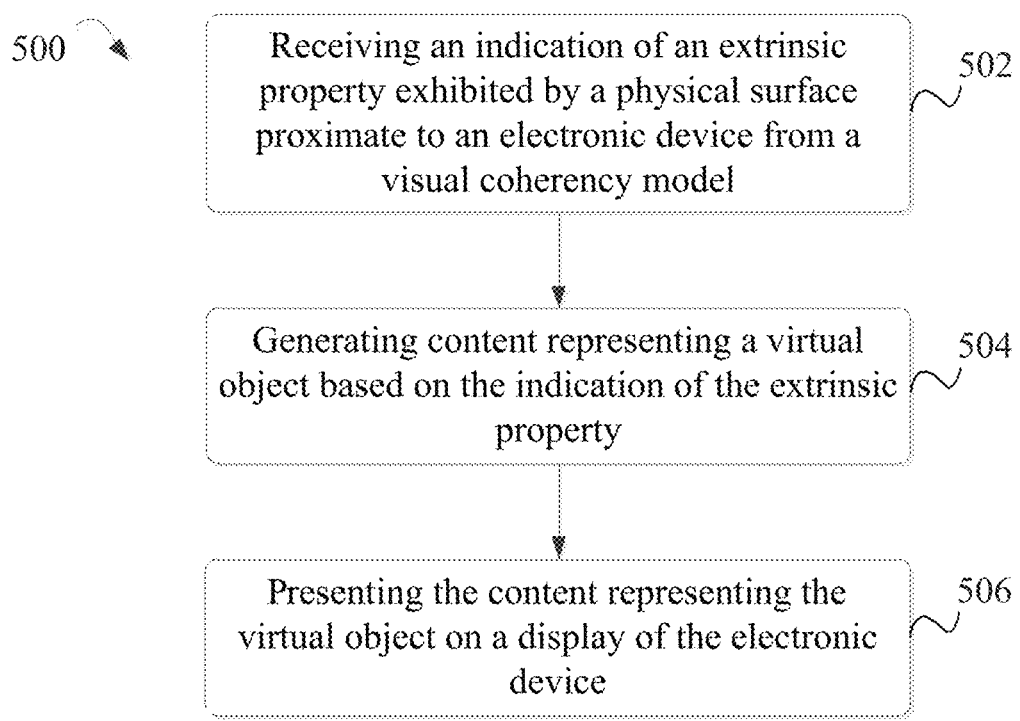
FIG. 5 is a flow-chart illustrating another example of a method for providing visual coherency between virtual objects and a physical environment.

FIG. 5 is a flow-chart illustrating another example of a method 500 for providing visual coherency between virtual objects and a physical environment. At block 502, method 500 includes obtaining an extrinsic property exhibited by a physical surface proximate to an electronic device from a visual coherency model. In one implementation, the extrinsic property is obtained by CGR presentation unit 244 of FIG. 2. In one implementation, a value for the extrinsic property is obtained from the visual coherency model. In one implementation, the visual coherency model is implemented using visual coherency model 242 of FIG. 2. In one implementation, the visual coherency model determines the value for the extrinsic property exhibited by the physical surface based on image data depicting the physical surface. In one implementation, the image data depicting the physical surface is obtained using an image sensor of the electronic device. In one implementation, the image data depicting the physical surface is obtained using an image sensor external to the electronic device.

At block 504, method 500 includes generating content representing a virtual object based on the extrinsic property. In one implementation, generating the content representing the virtual object is based on a value for the extrinsic property. At block 506, method 500 includes presenting the content representing the virtual object (e.g., virtual object 820 of FIG. 8) on a display of the electronic device. In one implementation, presenting the content representing the virtual object comprises identifying a placement position for the virtual object on the display based on a spatial location of the physical surface in the physical environment relative to the electronic device. In one implementation, the spatial location is determined using an image sensor of the electronic device. In one implementation, the spatial location is determined using an image sensor external to the electronic device. In one implementation, the display is a see-through display with a portion of the physical environment being visible through the see-through display. In one implementation, the display is a display device comprising a plurality of pixels.

In one implementation, the obtained value for the extrinsic property is an initial value. In one implementation, method 500 further includes obtaining an updated value for the extrinsic property (that is distinct from the initial value) while presenting the content representing the virtual object on the display. In one implementation, the updated value corresponds to a change in the extrinsic property exhibited by the physical surface subsequent to obtaining the initial value (e.g., physical object 910 of FIG. 9). In one implementation, method 500 further includes, updating the content representing the virtual object (e.g., virtual object 920 of FIG. 9) in accordance with obtaining the updated value. In one implementation, the updated content reflects the change in the extrinsic property exhibited by the physical surface subsequent to obtaining the initial value. In one implementation, method 500 further includes, presenting the updated content representing the virtual object on the display.

In one implementation, a physical surface in a physical environment is identified using an eye tracking characteristic of a user that indicates the user is looking at the physical surface prior to obtaining first content depicting the physical surface. In one implementation, the eye tracking characteristic is determined based on image data that corresponds to at least a portion of the user's face that includes the eyes of the user. In one implementation, the image data that corresponds to at least the portion of the user's face is obtained using image sensor system 206. In one implementation, image sensor system(s) 206 includes an illumination source that emits optical energy (e.g., light) upon the portion of the user's face, such as a flash or a glint source. In one implementation, content representing a virtual object is generated based on an extrinsic property exhibited by the physical surface identified using the eye tracking characteristic.

In one implementation, content representing a virtual object (e.g., virtual object 1020 of FIG. 10) is generated based on a plurality of extrinsic properties exhibited by a physical surface. In one implementation, the plurality of extrinsic properties exhibited by the physical surface is determined based on content depicting the physical surface using one visual coherency model. In one implementation, the plurality of extrinsic properties exhibited by the physical surface is determined based on content depicting the physical surface using a plurality of visual coherency models that each are configured to determine at least one extrinsic property.

In one implementation, content representing a virtual object (e.g., virtual object 1120 of FIG. 11) is generated, in part, based on a geometry of the virtual object. In one implementation, determining the geometry of the virtual object involves evaluating data (e.g., a file) residing in memory (e.g., memory 220) of electronic device 110 that defines parameters or properties of virtual object.

In some implementations, content depicting a physical surface also depicts a region of a physical environment proximate to the physical surface. In one implementation, the content depicting the physical surface is pre-processed prior to determining an extrinsic property exhibited by the physical surface or a value for the extrinsic property. In one implementation, pre-processing the content depicting the physical surface includes segmenting the content into a plurality of image segments that each correspond to distinct features in the region. In one implementation, content depicting a physical surface includes a sequence of temporally-spaced images depicting a region of a physical environment proximate to the physical surface. In one implementation, pre-processing the content depicting the physical surface includes performing image rectification on the sequence of temporally-spaced images depicting the region.

In one implementation, pre-processing the content depicting the physical surface includes estimating a geometry corresponding to at least a portion of a region of a physical environment. In one implementation, content representing a virtual object (e.g., virtual object 1220 of FIG. 12) is generated, in part, based on that estimated geometry. In one implementation, the geometry corresponding to the region of the physical environment is estimated using structure-from-motion information obtained using the content. In one implementation, the geometry corresponding to the region of the physical environment is estimated using the content and depth information obtained from image sensor system 206. In one implementation, the geometry corresponding to the region of the physical environment is estimated using a single image frame obtained from the content.

Figure 18:
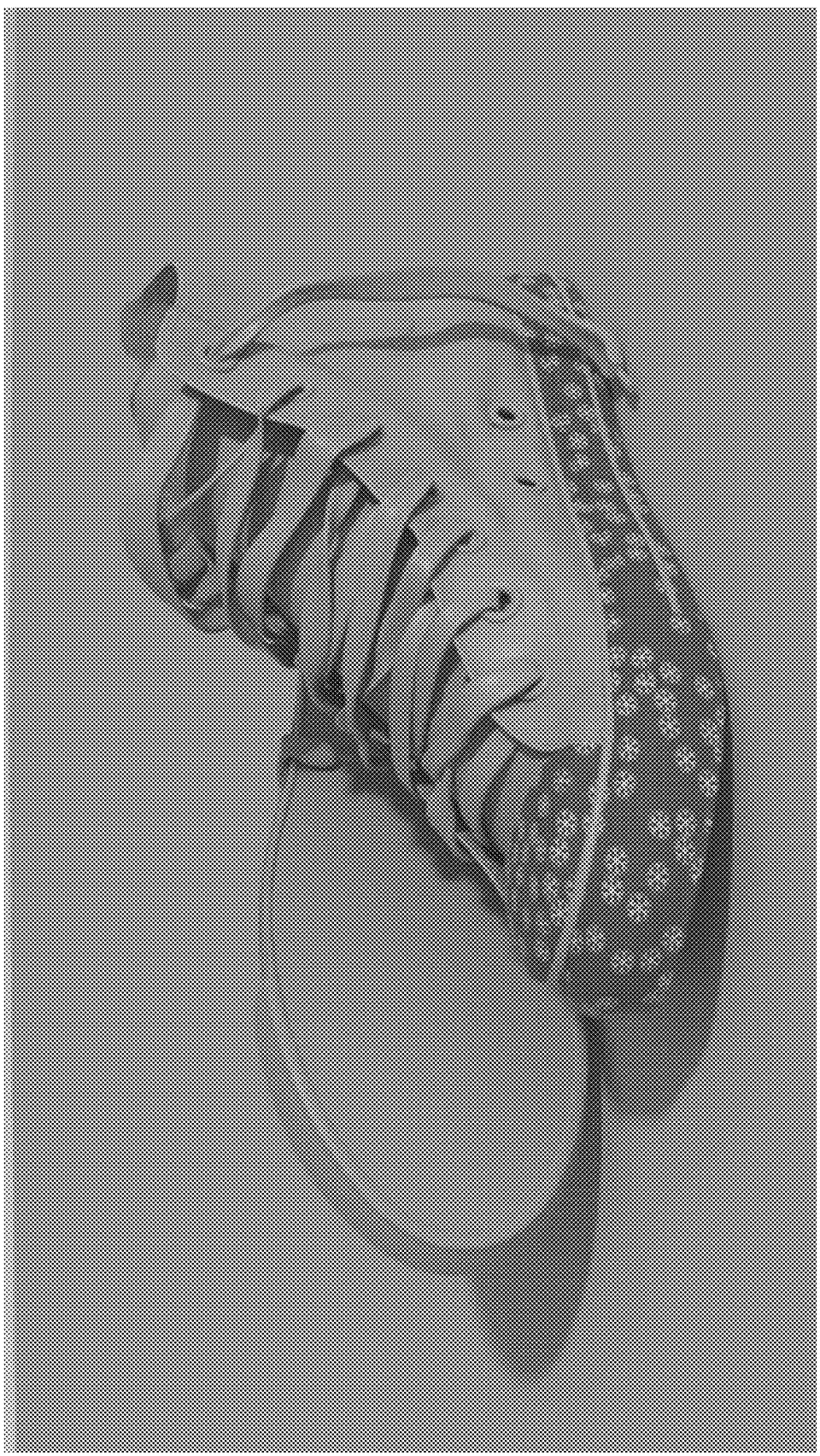
FIG. 18 illustrates an example of texture splatting the point cloud representation of FIG. 14 with the texture splat of FIG. 15.

In one implementation, generating content representing a virtual object includes texture splatting a point cloud representation of the virtual object based on a value for an extrinsic property. An example of texture splatting a point cloud representation of a virtual object is illustrated in FIG. 18. In one implementation, generating content representing a virtual object includes generating a procedural texture map having at least one parameter defined based on a value for an extrinsic property. In this implementation, the procedural texture map is applied to a surface of a three-dimensional representation of the virtual object.

In one implementation, content depicting a physical surface depicts the physical surface from a plurality of different viewpoints. In this implementation, a value for an extrinsic property exhibited by the physical surface is determined based on such content and camera pose information. In this implementation, the camera pose information corresponds to at least a subset of the plurality of different viewpoints. In one implementation, the camera pose information is associated with virtual cameras.

In one implementation, generating content representing a virtual object includes modulating a material property corresponding to a surface of a three-dimensional representation of the virtual object based on a value for an extrinsic property. In one implementation, generating content representing a virtual object includes applying a texture splat (or decal image) to a surface of a three-dimensional representation of the virtual object based on a value for an extrinsic property.

In one implementation, method 300, method 400, or method 500 is performed by processing logic, including hardware, firmware, software, or a combination thereof. In one implementation, method 300, method 400, or method 500 is performed by a processor executing code stored in a non-transitory computer-readable medium (e.g., a memory).

Figure 6:
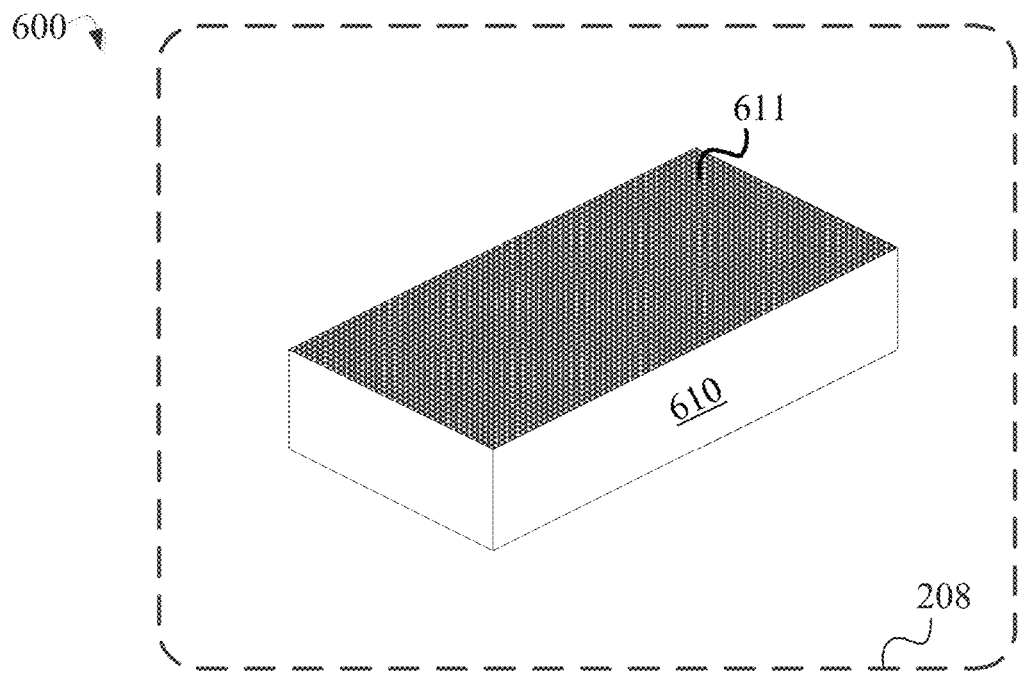
FIG. 6 illustrates an example of a view presented on a display of an electronic device that includes first content depicting a physical object in a physical environment proximate to the electronic device having a physical surface that exhibits an extrinsic property.

FIG. 6 illustrates a view 600 presented by display 208 that includes first content depicting a physical surface 611 of a physical object 610 in a physical environment proximate to electronic device 110. The first content presented on display 208 in example 600 is obtained using an image sensor. In one implementation, the image sensor is a component of electronic device 110 (e.g., image sensor 112). In one implementation, the image sensor is external to electronic device 110. As depicted in FIG. 6, physical surface 611 exhibits an extrinsic property. The extrinsic property exhibited by physical surface 611 could represent dust that has accumulated on physical object 610. As discussed above, visual coherency model 242 of electronic device 110 determines the extrinsic property or a value for the extrinsic property that CGR presentation unit 244 may utilize to generate second content representing a virtual object.

In view 600, physical surface 611 is a peripheral surface of physical object 610. However, other implementations are not so limited. In accordance with some implementations, visual coherency model 242 may determine extrinsic properties (or values for the extrinsic properties) exhibited by physical surfaces that are unassociated with particular objects in a physical environment. For example, if the physical environment corresponds to an indoor space (e.g., a room within a building), visual coherency model 242 determines an extrinsic property exhibited by a physical surface that defines the indoor space (e.g., a floor, a wall, a ceiling, and the like). As another example, the physical environment may correspond to an outdoor space, such as a mountain forest. In this example, visual coherency model 242 determines an extrinsic property exhibited a rock outcropping extending from the mountain or a forest floor underlying the mountain forest.

Figure 7:
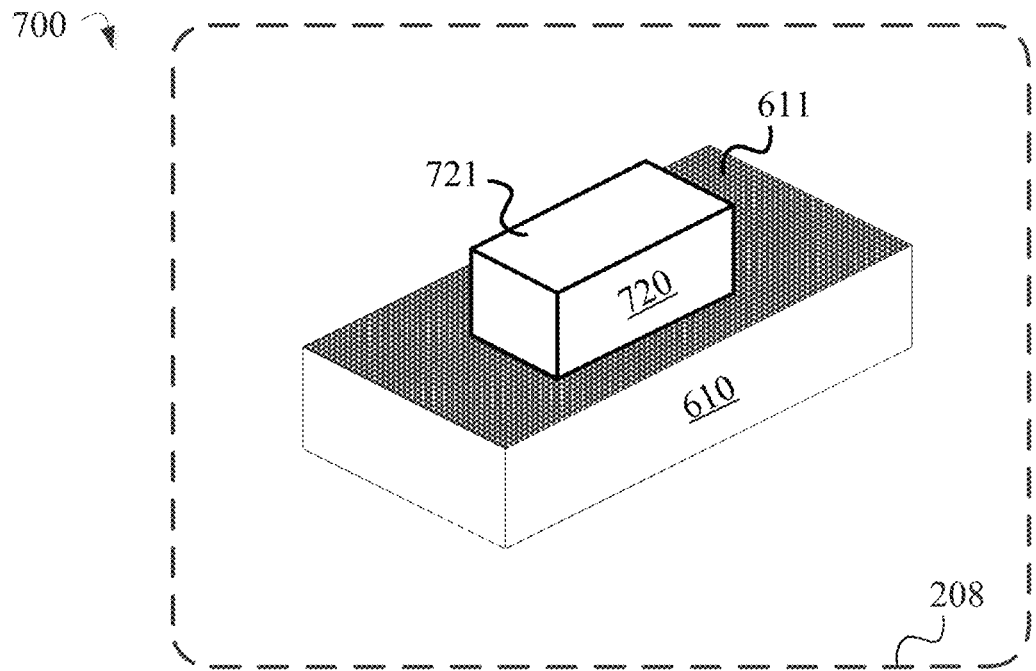
FIG. 7 illustrates an example of a view presented on the display that includes second content representing a virtual object that is not generated based on an extrinsic property exhibited by the physical surface illustrated in FIG. 6.
Figure 8:
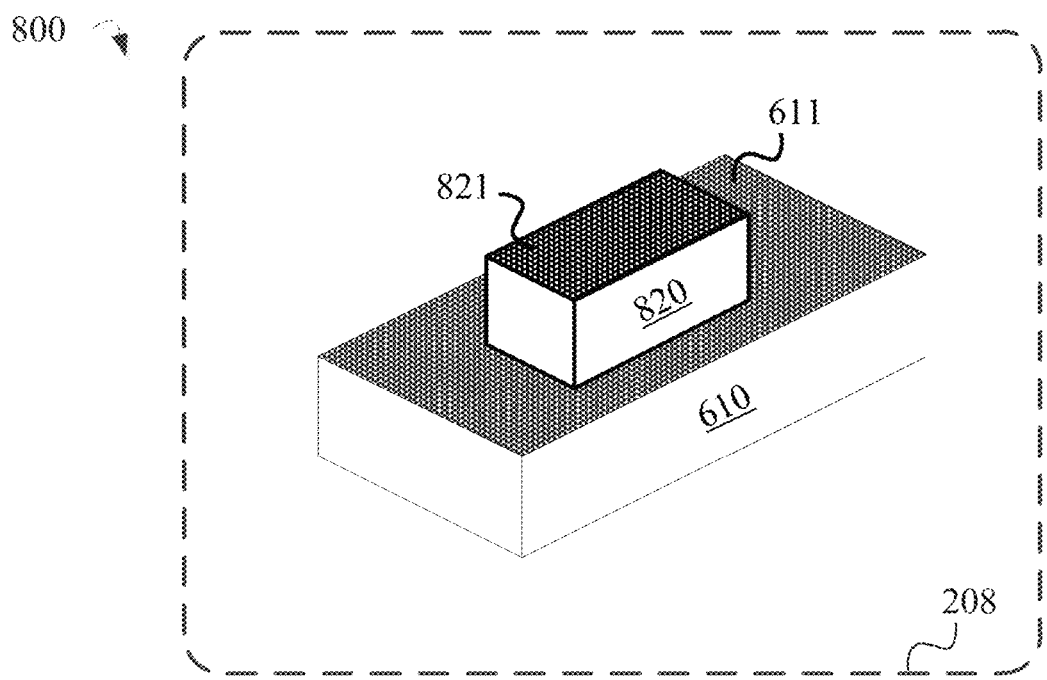
FIG. 8 illustrates an example of a view presented on the display that includes second content representing a virtual object that is generated based on an extrinsic property exhibited by the physical surface illustrated in FIG. 6.

FIGS. 7-8 are examples of display 208 presenting second content representing virtual objects having varying degrees of visual coherency with the physical environment depicted in the first content seen in FIG. 6. View 700 of FIG. 7 includes both second content representing virtual object 720 and the first content depicting physical object 610. View 800 of FIG. 8 includes both second content representing virtual object 820 and the first content depicting physical object 610.

In one implementation, CGR presentation unit 244 does not utilize the extrinsic property (or value for the extrinsic property) that the visual coherency model 242 determines is exhibited by physical surface 611 when generating the second content representing virtual object 720. That is, generating the second content representing virtual object 720 is not based on the extrinsic property (or value for the extrinsic property) that visual coherency model 242 determines is exhibited by physical surface 611.

In one implementation, CGR presentation unit 244 does utilize the extrinsic property (or value for the extrinsic property) that the visual coherency model 242 determines is exhibited by physical surface 611 when generating the second content representing virtual object 820. That is, generating the second content representing virtual object 820 is based on the extrinsic property (or value for the extrinsic property) that visual coherency model 242 determines is exhibited by physical surface 611.

A comparison between the FIGS. 7 and 8 illustrates that a visual coherence between virtual object 720 and physical object 610 in view 700 is less than a visual coherence between virtual object 820 and physical object 610 in view 800. Such discrepancy in visual coherencies may be seen by comparing virtual surface 721 of view 700 with virtual surface 821 of view 800. In particular, virtual surface 821 of view 800 exhibits a visual appearance corresponding to the extrinsic property exhibited by physical surface 611 whereas virtual surface 721 of view 700 does not. Continuing with the example above in which the extrinsic property represents dust that has accumulated on physical object 610, an appearance of virtual surface 721 has not been modified to appear dusty like physical surface 611 whereas an appearance of virtual surface 821 has been modified to appear dusty.

Figure 9:
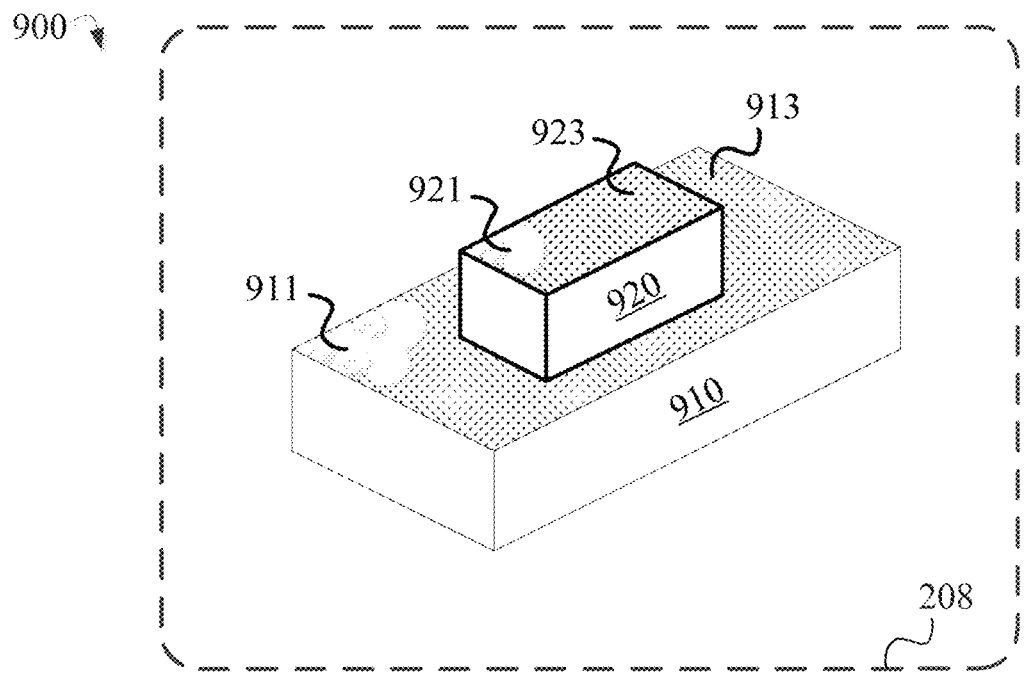
FIG. 9 illustrates an example of a view presented on the display that includes updated second content reflecting a change in the extrinsic property exhibited by the physical surface.

Turning to FIG. 9, an extrinsic property exhibited by a physical surface in a physical environment may change while presenting content representing a virtual object. To maintain visual coherency between virtual objects and the physical environment, content representing the virtual objects may be updated to reflect that change in the extrinsic property. By way of example, the extrinsic property may represent dust that has accumulated on physical object 610, as discussed above with reference to FIG. 6. While presenting the second content representing virtual object 820 on display 208, as illustrated in FIG. 8, a wind gust may disturb the dust accumulated on physical object 610.

A comparison between the FIGS. 6 and 9 illustrates this change in the extrinsic property. Prior to being disturbed by the wind gust, dust is distributed consistently across physical surface 611 of physical object 610 in view 600. Yet, after being disturbed by the wind gust, that dust is no longer uniformly distributed, as illustrated in view 900. In view 900, updated first content depicting that change in the extrinsic property is obtained by an image sensor and presented on display 208. The updated first content presented on display 208 in view 900 includes physical object 910, which represents physical object 610 after being disturbed by the wind gust.

In FIG. 9, a first physical surface region 911 represents a first portion of physical surface 611 that was in closer proximity to a source of the wind gust than a second portion of physical surface 611 that is represented by second physical surface region 913. By virtue of that closer proximity to the source of the wind gust, first physical surface region 911 is largely devoid of dust in view 900. While not being complete devoid of dust, the wind gust has left second physical surface region 913 with less dust than a corresponding portion of physical surface 611.

In addition to being presented on display 208, the updated first content is also provided to visual coherency model 242. Based on the updated first content, visual coherency model 242 determines an updated extrinsic property (or an updated value for the extrinsic property) that corresponds to the change in the extrinsic property. CGR presentation unit 244 obtains the updated extrinsic property (or updated value) while the second content representing virtual object 820 (of FIG. 8) is presented on display 208. In accordance with obtaining the updated extrinsic property (or the updated value), CGR presentation unit 244 updates the second content representing virtual object 820. Updating the second content representing virtual object 820 forms updated second content representing virtual object 920 of FIG. 9. That updated second content reflecting the change in the extrinsic property is presented on display 208 as illustrated in view 900.

FIG. 9 further illustrates that similar to the non-uniform distribution of the extrinsic property (e.g., dust) exhibited by physical object 910, CGR presentation unit 244 may non-uniformly modify a surface appearance of virtual object 920 in generating the updated second content. For example, first virtual surface region 921 proximate to first physical surface region 911 appears to also be largely devoid of dust in example 900. In one implementation, generating first virtual surface region 921 involves CGR presentation unit 244 applying a texture-based decal to a surface of a three-dimensional representation of virtual object 920. As another example, second virtual surface region 923 proximate to second physical surface region 913 appears to also be less dusty than a corresponding portion of virtual surface 821 prior to being disturbed by the wind gust.

Figure 10:
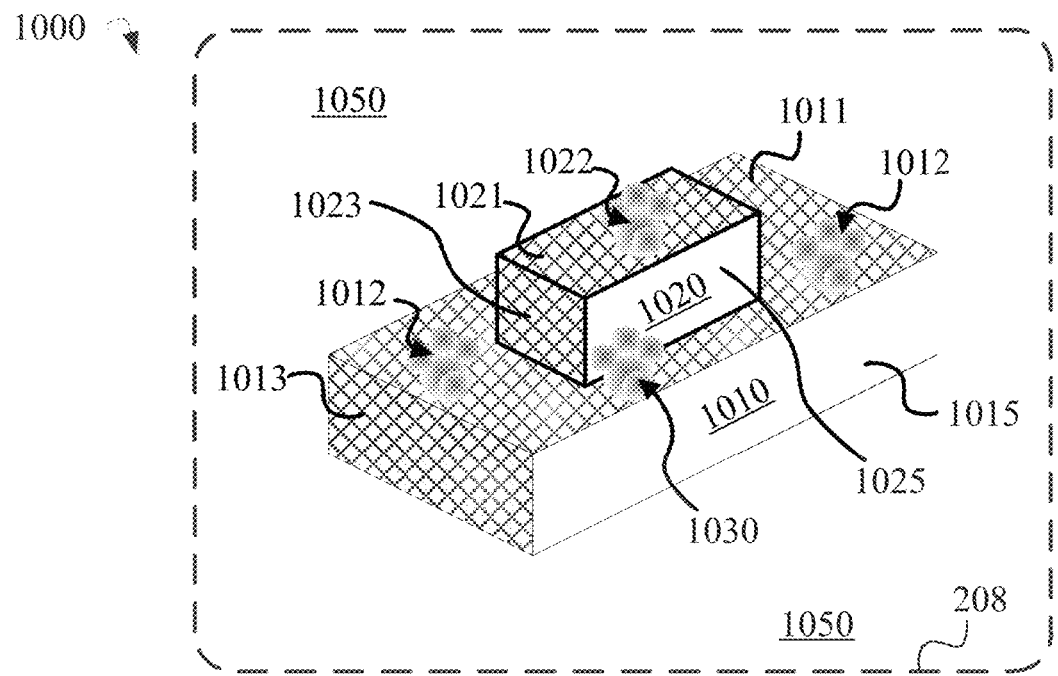
FIG. 10 illustrates an example of a view presented on the display that includes second content representing a virtual object that is generated based on a plurality of extrinsic properties exhibited by a plurality of surfaces of a physical object.

As shown by FIG. 10, an extrinsic property exhibited by multiple physical surfaces may be determined while providing visual coherency between virtual objects and a physical environment. In view 1000, two surfaces (e.g., physical surfaces 1011 and 1013) of physical object 1010 exhibit an extrinsic property. The extrinsic property exhibited by physical surfaces 1011 and 1013 in view 1000 may represent a buildup of ice. In contrast, an exposure to solar radiation may preclude physical surface 1015 of physical object 1010 from exhibiting any icy buildup.

First content depicting physical surfaces 1011, 1013, and 1015 of physical object 1010 is obtained using an image sensor of electronic device 110 to present on display 208. As shown by FIG. 10, the first content also depicts a region 1050 of the physical environment proximate to physical surfaces 1011, 1013, and 1015. That first content is provided to visual coherency model 242 to determine the extrinsic property exhibited by physical surfaces 1011, 1013, and 1015. Prior to visual coherency model 242 determining the extrinsic property, machine vision unit 246 may pre-process the first content.

In one implementation, pre-processing the first content includes segmenting the first content into a plurality of image segments that each correspond to distinct features in region 1050. For example, in FIG. 10, physical surfaces 1011, 1013, and 1015 would each be considered distinct features in region 1050. In this example, pre-processing the first content may involve machine vision unit 246 performing foreground detection on the first content. As a result of performing foreground detection, machine vision unit 246 would distinguish a subset of the first content corresponding to physical object 1010 from the first content that is excluded from the subset (e.g., corresponding to region 1050). Pre-processing the first content may also involve machine vision unit 246 performing edge detection on the first content. As a result of performing edge detection, machine vision unit 246 identifies boundaries between physical object 1010 and the region 1050 of the proximate physical environment. Performing edge detection may also facilitate identifying boundaries between physical surfaces 1011, 1013, and 1015 of physical object 1010.

Based on the first content, visual coherency model 242 determines the extrinsic property exhibited by physical surfaces 1011, 1013, and 1015. Visual coherency model 242 provides the extrinsic property exhibited by physical surfaces 1011, 1013, and 1015 to CGR presentation unit 244. CGR presentation unit 244 generates second content representing virtual object 1020 based on the extrinsic property exhibited by physical surfaces 1011, 1013, and 1015 to CGR presentation unit 244.

To provide visual coherency between virtual object 1020 and the physical environment proximate to electronic device 110, CGR presentation unit 244 modifies a surface appearance of virtual object 1020 to reflect a surface appearance of physical object 1010 in generating the second content. For example, in example 1000, virtual surfaces 1021 and 1023 appear to exhibit the extrinsic property (e.g., icy buildup) exhibited by physical surfaces 1011 and 1013, respectively. Similar to physical surface 1015, virtual surface 1025 does not appear to exhibit any icy buildup, in view 1000.

FIG. 10 further illustrates that a plurality of extrinsic properties exhibited by physical surfaces may be determined while providing visual coherency between virtual objects and a physical environment. In addition to the icy buildup extrinsic property exhibited by physical surfaces 1011 and 1013 discussed above, physical surface 1011 exhibits a second extrinsic property 1012 in view 1000. The second extrinsic property 1012 exhibited by physical surface 1011 may represent an accumulation of snow covering portions of the icy buildup.

Based on the first content depicting physical object 1010, visual coherency model 242 determines the second extrinsic property exhibited by physical surfaces 1011. Visual coherency model 242 provides the second extrinsic property 1012 exhibited by physical surfaces 1011 to CGR presentation unit 244. In this instance, CGR presentation unit 244 generates second content representing virtual object 1020 based on the icy buildup extrinsic property discussed above and the second extrinsic property 1012 exhibited by physical surface 1011. As shown by FIG. 10, the second content representing virtual object 1020 includes a portion 1022 of virtual surface 1021 that appears to have an accumulation of snow covering portions of the icy buildup.

In one implementation, providing visual coherency between virtual object 1020 and the physical environment proximate to electronic device 110 involves overlaying a portion of the first content depicting physical object 1010 with virtual visual content 1030. In one implementation, the virtual visual content 1030 may form part of the second content representing virtual object 1020. In one implementation, the virtual visual content 1030 may be distinct from the second content representing virtual object 1020. For example, the virtual visual content 1030 may represent a second virtual object.

In one implementation, visual coherency model 242 is composed of one visual coherency model configured to determine both the icy buildup extrinsic property exhibited by physical surfaces 1011 and 1013 and the second extrinsic property 1012 exhibited by physical surface 1011. In one implementation, visual coherency model 242 is composed of two visual coherency models: a first visual coherency model and a second visual coherency model. The first visual coherency model of this implementation is configured to determine the icy buildup extrinsic property exhibited by physical surfaces 1011 and 1013. The second visual coherency model of this implementation is configured to determine the second extrinsic property 1012 exhibited by physical surface 1011.

Figure 11:
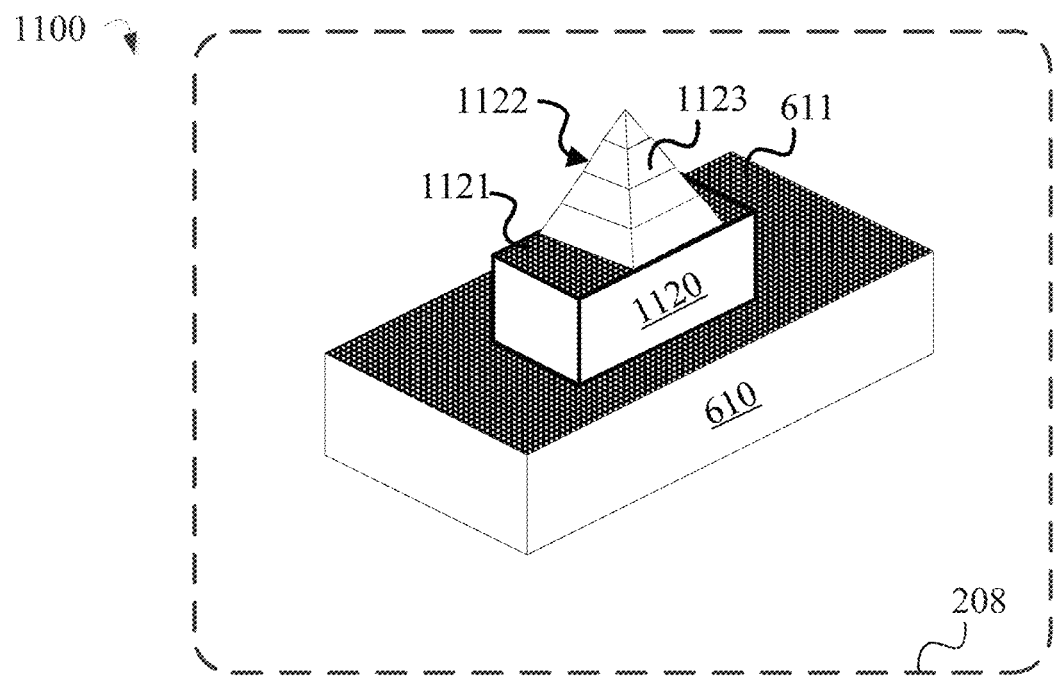
FIG. 11 illustrates an example of a view presented on the display that includes second content representing a virtual object that is generated based on a geometry of the virtual object.
Figure 12:
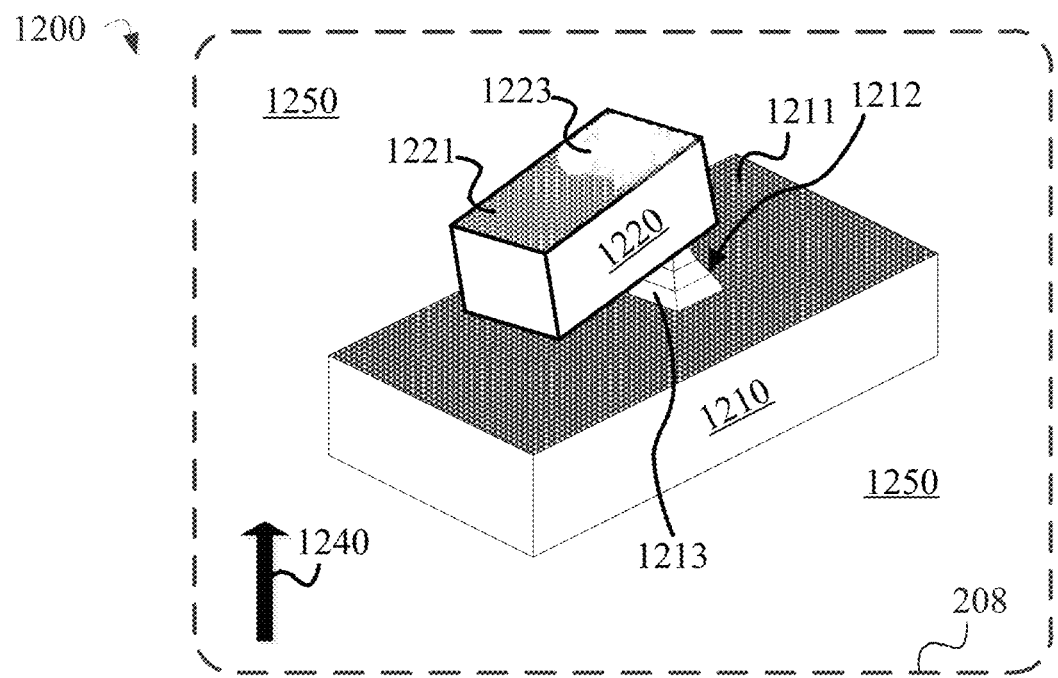
FIG. 12 illustrates an example of a view presented on the display that includes second content representing a virtual object that is generated based on a geometry of a physical surface.

FIGS. 11 and 12 illustrate that content representing a virtual object may be generated, in part, based on object geometries. For example, in FIG. 11, view 1100 includes physical object 610 comprising physical surface 611. As discussed above with respect to FIG. 6, the extrinsic property exhibited by physical surface 611 could represent dust that has accumulated on physical object 610. Unlike virtual object 620 of FIG. 6 that is depicted as having a relatively flat upper surface (e.g., virtual surface 621), an upper surface (e.g., virtual surface 1121) of virtual object 1120 includes an elevated feature 1122. If virtual object 1120 existed in the physical environment, physical forces (e.g., gravity) acting on virtual object 1120 may preclude any dust from accumulating on elevated feature 1122.

To provide visual coherency between virtual objects and the physical environment proximate to electronic device 110, CGR presentation unit 244 may take a geometry of the virtual objects into account when generating content representing the virtual objects. For example, in generating content representing virtual object 1120, CGR presentation unit 244 modifies a surface appearance of virtual object 1120 to reflect a surface appearance that a similarly shaped physical object would have in that physical environment. In one implementation, generating content representing virtual object 1120 involves determining a geometry of virtual object 1120. In one implementation determining the geometry of virtual object 1120 involves evaluating data (e.g., a file) residing in memory (e.g., memory 220) of electronic device 110 that defines parameters or properties of virtual object 1120.

As shown by FIG. 11, elevated or sloped surfaces of virtual object 1120 such as virtual surface 1123 appear to be largely devoid of dust whereas flatter surfaces of virtual object 1120 such as virtual surface 1121 appear dusty like physical surface 611. One skilled in the art will appreciate that other geometries of virtual objects beyond having elevated or sloped surfaces may be taken into account when generating content representing the virtual objects. For example, some extrinsic parameters (e.g., rust) may be exhibited in recessed areas of a physical object's surface (e.g., the various nooks and crannies that may exist on the surface of the physical object) before they are exhibited in other non-recessed surface areas. In this example, the geometry of virtual object 1120 that is determined to generate content representing virtual object 1120 may correspond to recessed areas of virtual surfaces about a periphery of virtual object 1120. Evaluating occlusion properties defined for the virtual surfaces about the periphery of virtual object 1120 may facilitate that determination.

Turning to FIG. 12, view 1200 includes first content depicting physical object 1210. As shown by FIG. 12, unlike physical object 610 of FIG. 11 that is depicted as having a relatively flat upper surface (e.g., physical surface 611), an upper surface (e.g., physical surface 1211) of physical object 1210 includes an elevated feature 1212. If the extrinsic property in FIG. 12 represents dust generally accumulated on physical surface 1211, physical forces (e.g., gravity) acting on physical object 1210 precludes any of that dust from accumulating on elevated feature 1212.

Virtual object 1220 is positioned in view 1200 as having one end disposed on elevated feature 1212 while an opposing end is disposed on the relatively flat upper surface of physical object 1210 corresponding to physical surface 1211. If physical object 1210 is presumed to be resting on a flat, horizontal surface in view 1200, an orientation of virtual surface 1221 is displaced in a vertical direction 1240 with respect to that horizontal surface by virtue of its placement. That displacement of virtual surface 1221 by elevated feature 1212 introduces an angle to virtual surface 1221 in a vertical direction 1240 with respect to the horizontal surface underlying physical object 1210 that would not otherwise exist.

FIG. 12 depicts the angle of virtual surface 1221 with respect to normal 1250 as being less than a similar angle associated with the elevated or sloped surfaces of elevated feature 1212 (e.g., physical surface 1213). As such, if virtual object 1220 existed in the physical environment, physical forces (e.g., gravity) acting on virtual object 1220 may not entirely preclude any dust from accumulating on virtual surface 1221, in contrast with the entire preclusion of dust accumulation on the elevated or sloped surfaces of elevated feature 1212. While such forces may not entirely preclude any dust from accumulating on virtual surface 1221, those forces would likely impact a distribution of dust across virtual surface 1221.

For example, an inclined region 1223 of virtual surface 1221 that is proximate to elevated feature 1212 appears to be largely devoid of dust. However, external to the inclined region 1223, virtual surface 1221 appears to have an accumulation of dust that is comparable to the accumulation of dust that is present on physical surface 1211 external to elevated feature 1212. Such non-uniform modification of the surface appearance of virtual object 1220 corresponds to CGR presentation unit 244 generating the second content representing virtual object 1220, in part, based on an estimated geometry associated with physical object 1210.

In one implementation, providing visual coherency between virtual object 1220 and the proximate physical environment involves pre-processing the first content prior to determining the extrinsic property exhibited by a physical surface (e.g., physical surface 1211). In this implementation, the first content depicting physical object 1210 also depicts a region 1250 of the physical environment proximate to physical object 1210. In one implementation, pre-processing the first content includes estimating a geometry corresponding to at least a portion of the region using structure-from-motion information obtained from the first content. In one implementation, pre-processing the first content includes estimating a geometry corresponding to at least a portion of the region based on the first content and depth information obtained from image sensor system 206. In one implementation, pre-processing the first content includes estimating a geometry corresponding to at least a portion of the region based on a single image frame obtained from the first content.

Figure 13:
FIG. 13 illustrates an example of a three-dimensional representation of a virtual object in accordance with some implementations.
Figure 14:
FIG. 14 illustrates an example of a point cloud representation of a surface corresponding to the three-dimensional representation of FIG. 13.

FIG. 13 illustrates an example of content representing virtual objects in accordance with some implementations. In the example of FIG. 13, the virtual objects are a pair of shoes and the content corresponds to a three-dimensional representation of the pair of shoes. At least part of a surface of the pair of shoes illustrated in FIG. 13 may be represented using a set of points where each represents a position in three-dimensional space. One example of such point cloud representations is illustrated in FIG. 14. In particular, the example of FIG. 14 illustrates a point cloud representation of a surface corresponding to a sole of one of the shoes.

Figure 17:
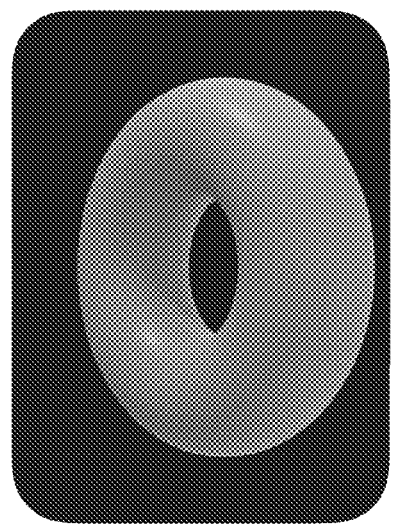
FIG. 17 illustrates another example of a texture splat in accordance with some implementations.
Figure 15:
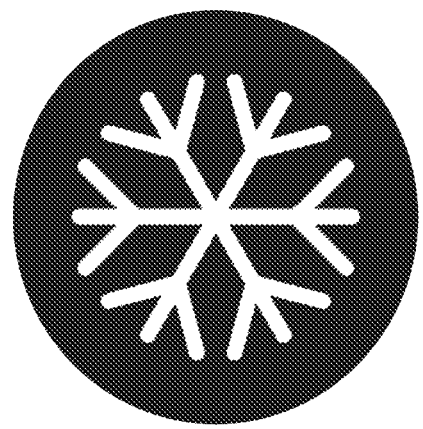
FIG. 15 illustrates an example of a texture splat in accordance with some implementations.
Figure 16:
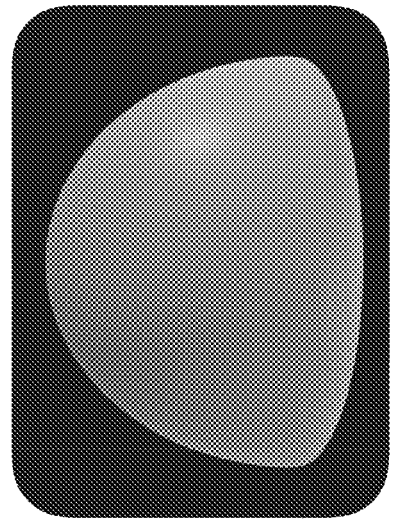
FIG. 16 illustrates another example of a texture splat in accordance with some implementations.

In some implementations providing visual coherency between virtual objects and a physical environment proximate to an electronic device involves texture splatting a point cloud representation of a virtual object. Texture splatting a point cloud representation refers to populating each point of the point cloud representation with a texture splat (or decal image) when generating content representing a virtual object. Examples of texture splats are illustrated in FIGS. 15-17. A texture splat may be implemented with two-dimensional image elements, as seen in FIG. 15, or with three-dimensional image elements, as seen in FIGS. 16 and 17.

Figure 19:
FIG. 19 illustrates an example of texture splatting the point cloud representation of FIG. 14 with the texture splat of FIG. 16.
Figure 20:
FIG. 20 illustrates an example of texture splatting the point cloud representation of FIG. 14 with the texture splat of FIG. 17.

FIG. 18 illustrates an example of texture splatting the point cloud representation of FIG. 14 with the texture splat of FIG. 15. FIG. 19 illustrates an example of texture splatting the point cloud representation of FIG. 14 with the texture splat of FIG. 16. FIG. 20 illustrates an example of texture splatting the point cloud representation of FIG. 14 with the texture splat of FIG. 17.

Figure 21:
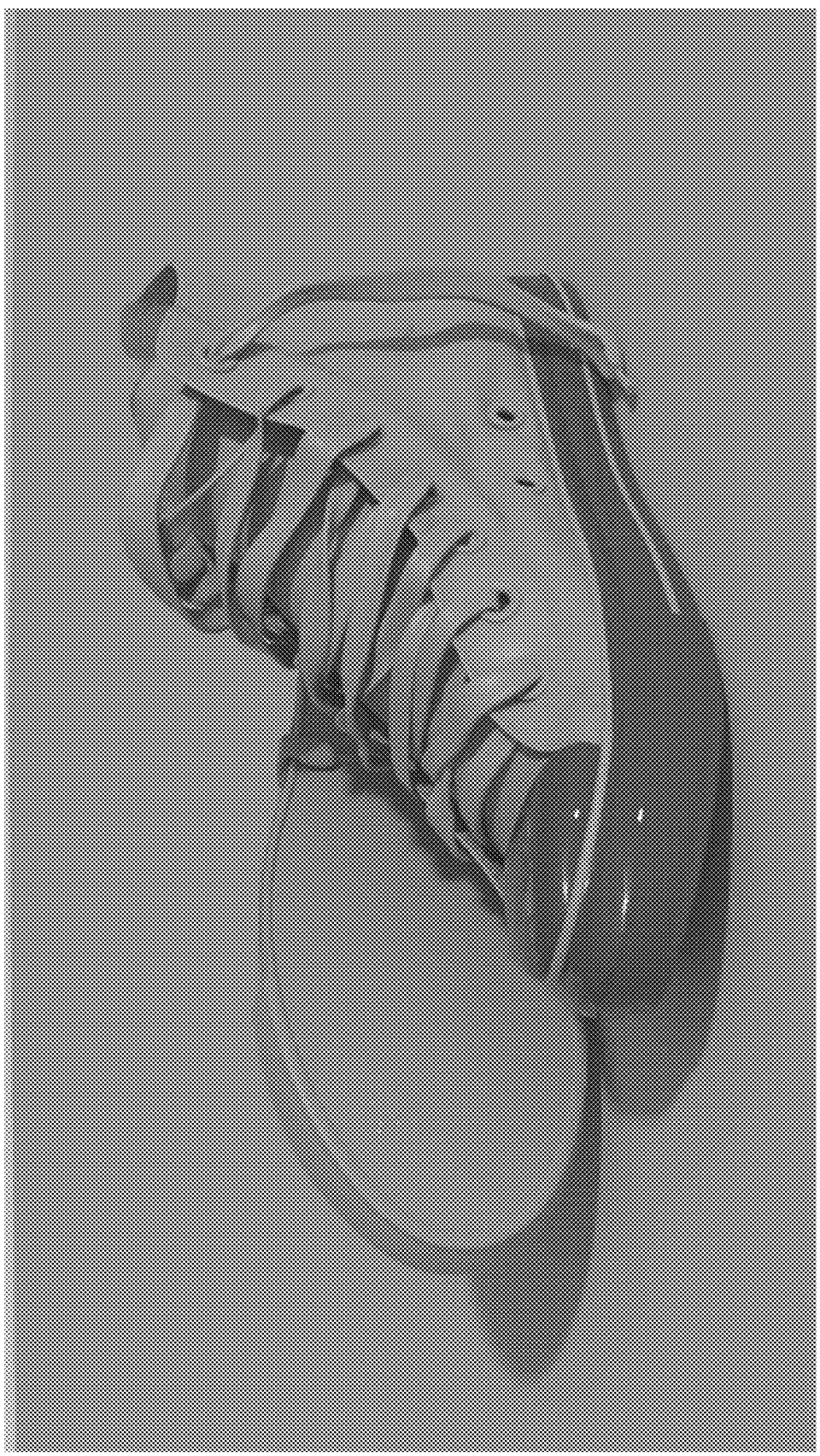
FIG. 21 illustrates an example of adding a material property to the three-dimensional representation of FIG. 13.

In some implementations, providing visual coherency between virtual objects and a physical environment proximate to an electronic device involves configuring a material property corresponding to a surface of a three-dimensional representation of the virtual object. Generally, a material property is configured to define how a surface of a three-dimensional representation of a virtual object is rendered, thereby defining a visual appearance of the surface. In one implementation, a material property is provided to a shader function of CGR Presentation Unit 244 of FIG. 2. In the example of FIG. 21, a "glossy" (or specular) material property has been added to the three-dimensional representation of FIG. 13 so that a surface of the shoe appears wet or devoid of wear.

Figure 22:
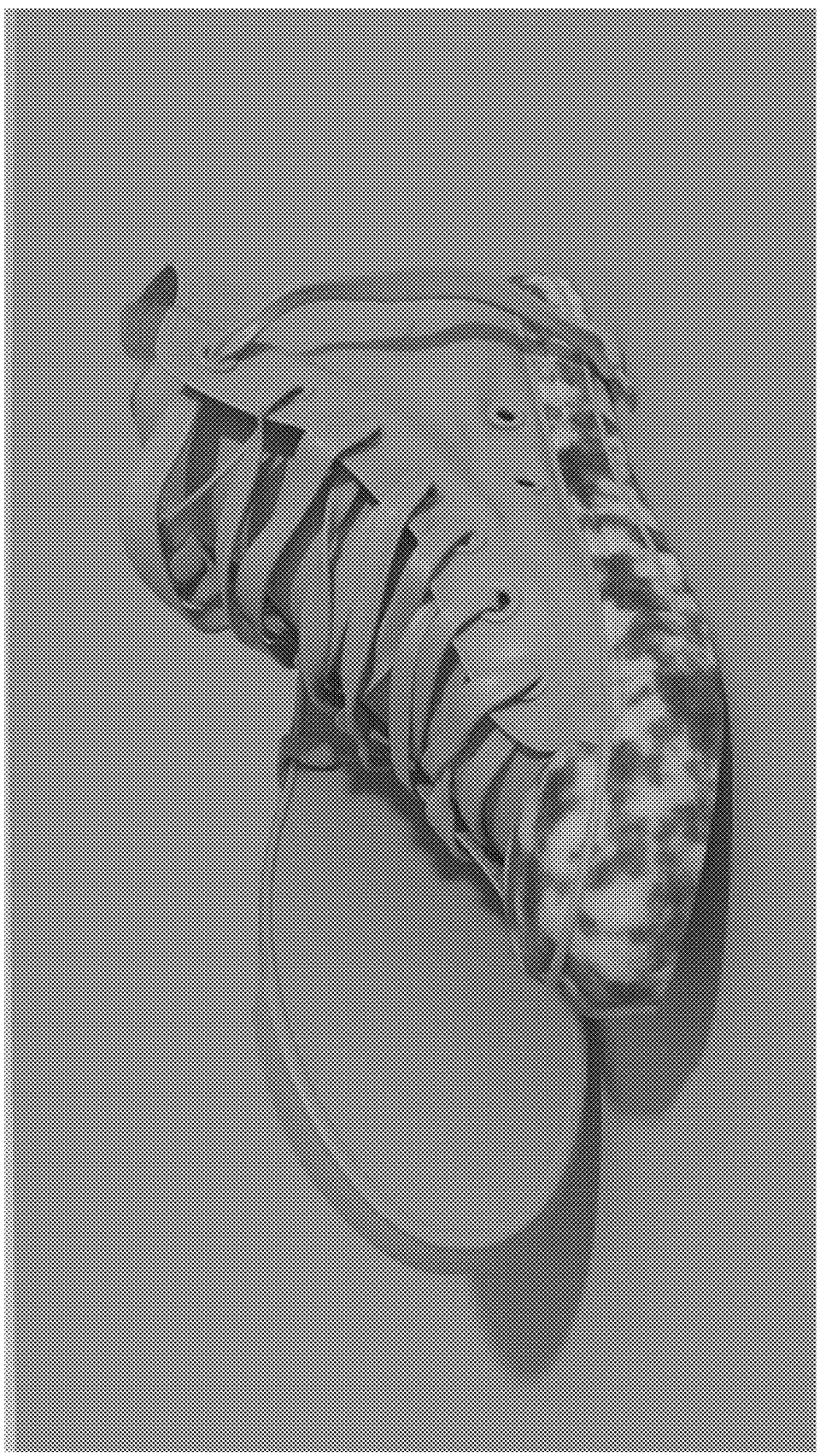
FIG. 22 illustrates an example of adding a texture to the three-dimensional representation of FIG. 13.
Figure 23:
FIG. 23 illustrates an example of texture modulating the material property of FIG. 21 with the texture of FIG. 22.

In some implementations providing visual coherency between virtual objects and a physical environment proximate to an electronic device involves modulating a material property corresponding to a surface of a three-dimensional representation of the virtual object. For example, in FIG. 22 a noise texture has been added to the three-dimensional representation of FIG. 13. The noise texture of FIG. 22 may be used to modulate the "glossy" material property illustrated in FIG. 21. In one implementation, modulating a material property with a texture involves concurrently adding the texture with the material property as a diffuse color. A comparison between FIGS. 21 and 23 illustrates that by modulating the "glossy" material property with the noise texture, a degree to which the surface of the shoe appears wet or devoid of wear may be changed.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "or" as used herein refers to and encompasses any and all possible combinations of one or more of the associated listed items. It will be further understood that the terms "comprises" or "comprising," when used in this specification, specify the presence of stated features, integers, steps, operations, elements, or components, but do not preclude the presence or addition of one or more other features, integers, steps, operations, elements, components, or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method of providing visual coherency between virtual objects and a physical environment, the method comprising:

at an electronic device with an image sensor:

obtaining first content depicting a physical surface in the physical environment using the image sensor;

determining an extrinsic property exhibited by the physical surface based on the first content using a visual coherency model, wherein the extrinsic property comprises a changed appearance of the physical surface resulting from one or more interactions of the physical surface with aspects of the physical environment;

generating second content representing a virtual object by changing an appearance of a surface of the virtual object to exhibit the extrinsic property, the changed appearance of the surface of the virtual object corresponding to one or more interactions of the surface of the virtual object with the aspects of the physical environment;

providing a view of the second content with the first content such that the surface of the virtual object and the physical surface in the physical environment exhibit the extrinsic property.

2. The method of claim 1, wherein the extrinsic property is dusty, wet, icy, rusty, dirty, or worn.

3. The method of claim 1, wherein the visual coherency model is trained to determine the extrinsic property using a set of training images that depict variations of the extrinsic property.

4. The method of claim 1, wherein a value for the extrinsic property is determined based on the first content using the visual coherency model.

5. The method of claim 4, wherein the second content representing the virtual object is generated based on the value for the extrinsic property.

6. The method of claim 4, wherein the value is a probability estimate that the physical surface exhibits the extrinsic property.

7. The method of claim 6, wherein generating the second content comprises changing an appearance of the virtual object by an amount, the amount based on the probability estimate.

8. The method of claim 1, wherein the visual coherency model is trained to determine values for the extrinsic property using a set of training images that depict variations of the extrinsic property.

9. The method of claim 1, wherein generating the second content representing the virtual object comprises:
texture splatting a point cloud representation of the virtual object based on the extrinsic property;
generating a procedural texture map having at least one parameter defined based on the extrinsic property and applying the procedural texture map to a surface of a three-dimensional representation of the virtual object;
modulating a material property corresponding to a surface of a three-dimensional representation of the virtual object based on the extrinsic property; or
applying a texture-based decal to a surface of a three-dimensional representation of the virtual object based on the extrinsic property.

10. The method of claim 1, wherein the first content depicting the physical surface also depicts a region of the physical environment proximate to the physical surface, and wherein the method further comprises:
pre-processing the first content prior to determining the extrinsic property exhibited by the physical surface.

11. The method of claim 10, wherein pre-processing the first content comprises:
segmenting the first content into a plurality of image segments that each correspond to distinct features in the region.

12. The method of claim 10, wherein the first content includes a sequence of temporally-spaced images depicting the region, and wherein pre-processing the first content comprises:
estimating a geometry corresponding to at least a portion of the region using structure-from-motion information obtained from the first content.

13. The method of claim 12, wherein the second content representing the virtual object is generated, in part, based on the estimated geometry.

14. The method of claim 12, wherein pre-processing the first content further comprises:
performing image rectification on the sequence of temporally-spaced images.

15. The method of claim 1, wherein the first content depicts the physical surface from a plurality of different viewpoints and wherein a value is determined based on the first content and camera pose information corresponding to at least a subset of the plurality of different viewpoints.

16. A system comprising:
an electronic device with a display;
a processor; and
a computer-readable storage medium comprising instructions that upon execution by the processor cause the system to perform operations, the operations comprising:
obtaining an extrinsic property exhibited by a physical surface proximate to the electronic device using a visual coherency model, wherein the extrinsic property comprises a changed appearance of the physical surface resulting from one or more interactions of the physical surface with aspects of a physical environment;
generating content representing a virtual object by changing an appearance of a surface of the virtual object to exhibit the extrinsic property, the changed appearance of the surface of the virtual object corresponding to one or more interactions of the surface of the virtual object with the aspects of the physical environment; and
providing a view of the surface of the virtual object exhibiting the extrinsic property and the physical surface in the physical environment exhibiting the extrinsic property.

17. The system of claim 16, wherein the visual coherency model is configured to determine the extrinsic property exhibited by the physical surface based on image data depicting the physical surface.

18. The system of claim 17, wherein the image data depicting the physical surface is received from an image sensor of the electronic device.

19. The system of claim 16, wherein, the visual coherency model is trained to determine the extrinsic property using a set of training images that depict variations of the extrinsic property.

20. A non-transitory computer-readable storage medium, storing program instructions computer-executable on a computer to perform operations comprising:
providing a set of training images depicting variations of an extrinsic property exhibited by physical surfaces;
training a visual coherency model with the set of training images using a machine learning process, the visual coherency model being configured to determine the extrinsic property exhibited by a physical surface based on image data depicting the physical surface, wherein the extrinsic property comprises a changed appearance of the physical surface resulting from one or more interactions of the physical surface with aspects of a physical environment; and integrating the visual coherency model into a computer-generated reality (CGR) application that generates content representing virtual objects for presentation on a display, a surface of a virtual object of the virtual objects and the physical surface exhibiting the extrinsic property, wherein the CGR application is configured to generate the content by changing an appearance of a surface of the virtual object to exhibit the extrinsic property, the changed appearance of the surface of the virtual object corresponding to one or more interactions of the surface of the virtual object with the aspects of the physical environment.

* * * * *